March 28, 1944. P. VOLLRATH 2,345,163
APPARATUS FOR MIXING, SIFTING, AND KNEADING
Filed Nov. 30, 1940 3 Sheets-Sheet 1
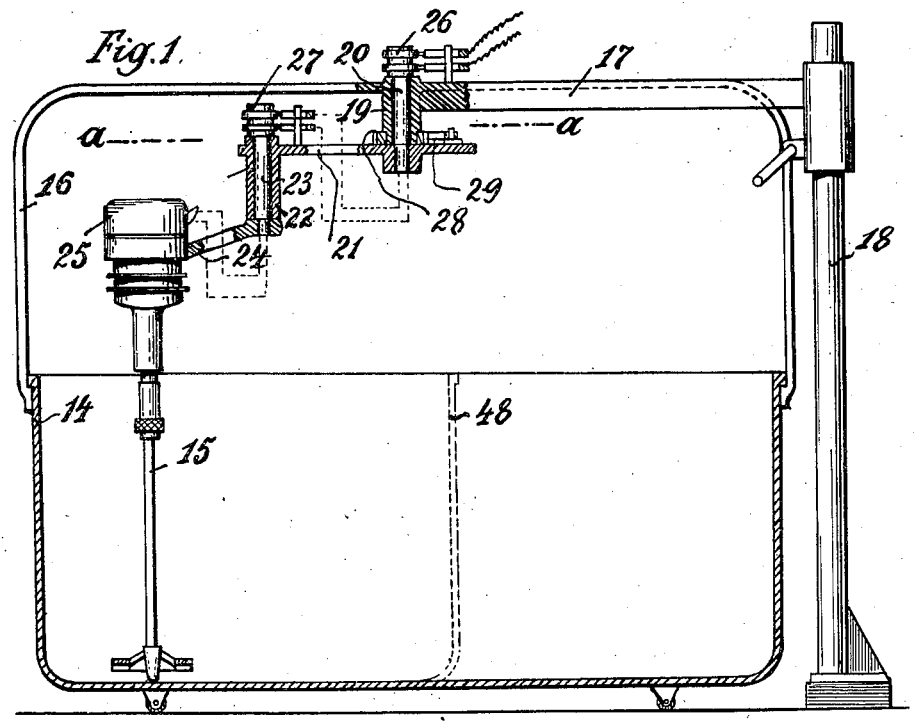
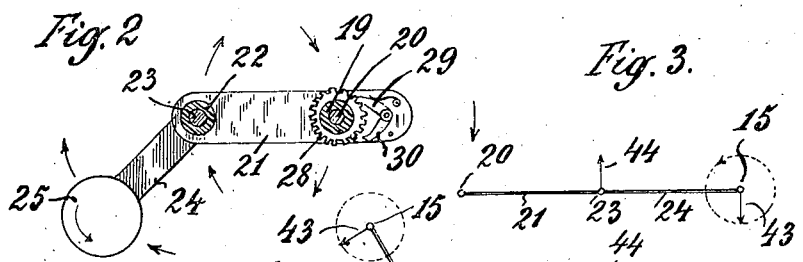
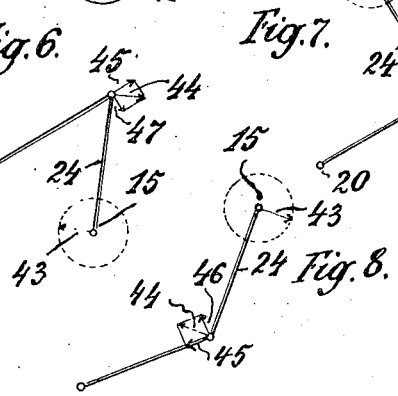
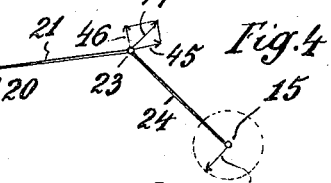
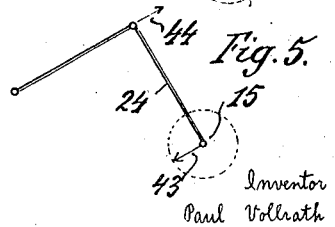
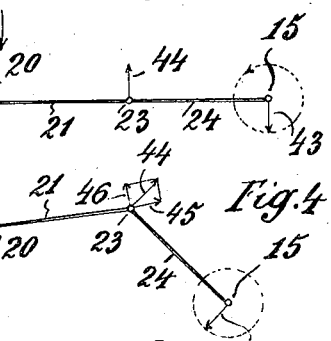
Inventor
Paul Vollrath
by Knight Bro
Attorneys March 28, 1944. P. VOLLRATH 2,345,163
APPARATUS FOR MIXING, SIFTING, AND KNEADING
Filed Nov. 30, 1940 3 Sheets-Sheet 2
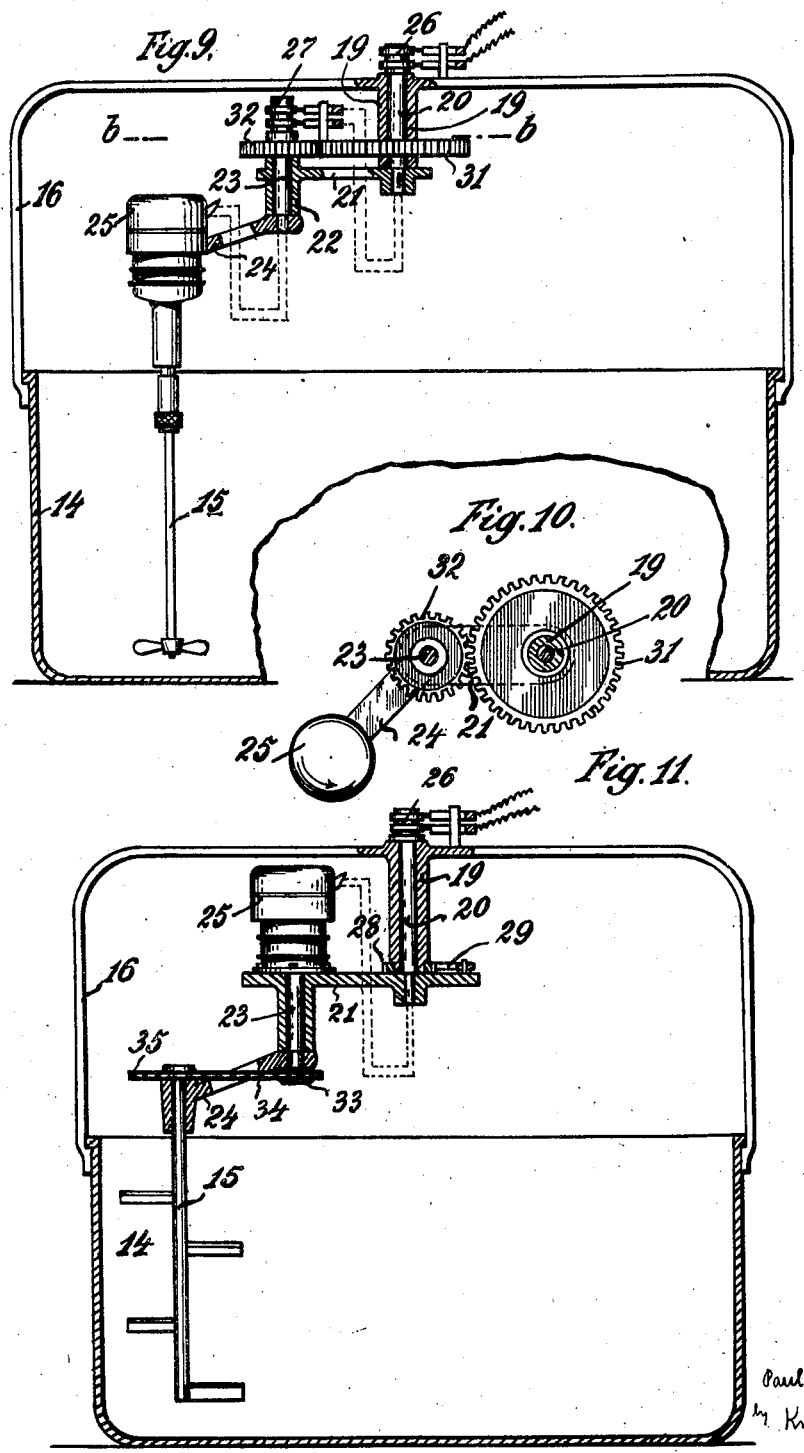

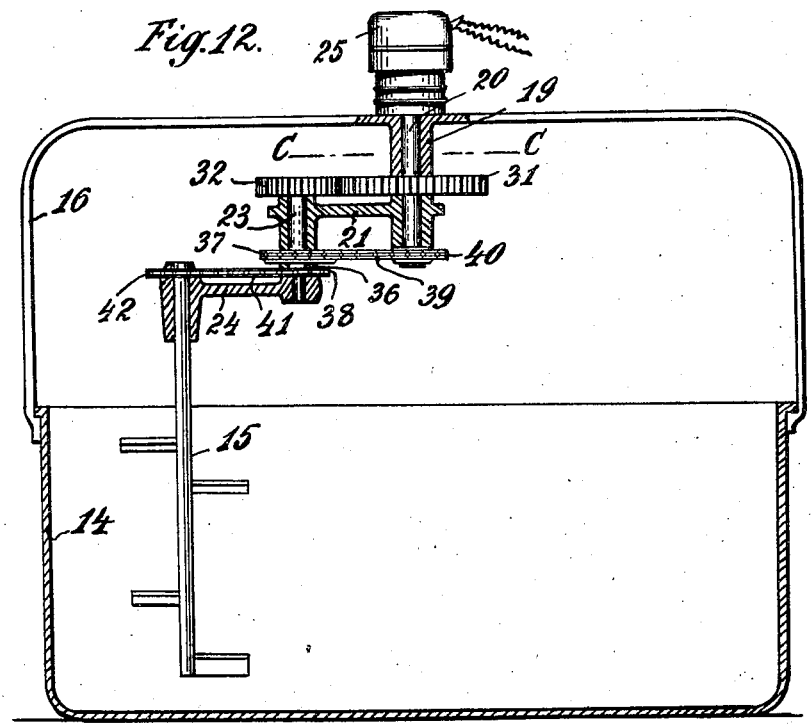
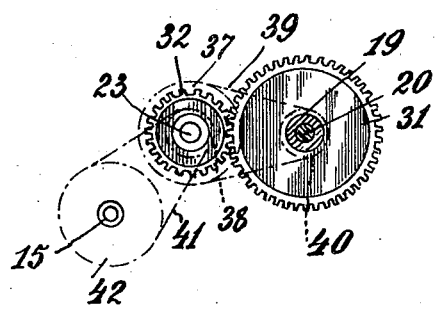

Patented Mar. 28, 1944

2,345,163

UNITED STATES PATENT OFFICE 2,345,163

APPARATUS FOR MIXING, SIFTING, AND KNEADING

Paul Vollrath, Cologne-on-the-Rhine, Germany; vested in the Alien Property Custodian Application November 30, 1940, Serial No. 368,050
In Germany November 30, 1939

2 Claims. (Cl. 259—102)

The invention relates to an apparatus for mixing, sifting and kneading of liquid, semi-liquid, pasty, pulverulent or dry material with a mixing, sifting or kneading tool arranged above a stationary or movable trough, the driving shaft of which tool is arranged eccentrically to the central axis of the trough on a jib-arm oscillatable about a vertical shaft. In apparatus of this kind, for instance planetary stirring apparatus, the mixing tool carries out a circulating movement about the vertical shaft of the jib-arm with the result that a very good and thorough mixing, sifting or kneading effect is produced.

The object of the invention is to further improve the mixing effect in apparatus of this type and to thereby save time, power and money. This is effected chiefly by mounting a rotary tool on a jointed jib arm in such a way that the reaction effect of the rotating tool against the material causes a composite circulating movement of the tool in the trough. The composite circulating movement is generated by circular movements about a plurality of axes. In some forms of the invention one of the circular movements is intermittent and its direction can be changed.

Means may be provided to stop either of the circular movements, so that the tool will be confined to a simple circular movement about one or the other axis; or to stop both circular movements to hold the tool to a stationary axis of rotation.

I am aware that machines for wet dressing ores are known, in which air injection nozzles are made to execute planetary movements by a reaction effect, but my invention is conceived for the purpose of obtaining special mixing, sifting, or kneading effects by means of a tool executing a combination of two different kinds of circulating movements.

Several embodiments of the invention are illustrated by way of example in the accompanying drawings, in which Fig. 1 is a vertical section through a mixing apparatus, Fig. 2 is a section on the line a—a of Fig. 1, Figs. 3 to 8 are diagrammatical illustrations of the forces and circulating movements of the tool, Fig. 9 is a vertical section of another form of construction according to the invention, Fig. 10 is a section on the line b—b of Fig. 9, Fig. 11 is a vertical section of a third modification, Fig. 12 is a vertical section of a fourth modification, and Fig. 13 a section on the line c—c of Fig. 12.

In all forms of construction of the invention the mixing trough is designated by 14 and the shaft of the mixing tool, which may be different according to the work to be done, is designated by 15.

In the form of construction shown in Figs. 1 and 2 a central shaft 20 is revolvably mounted either on a bow 16 extending over the trough 14 or on a supporting arm 17 which is adjustable in vertical direction along an upright 18. An arm 21 is keyed onto the central shaft 20, which is journalled in a bearing sleeve 19. This arm 21 carries at its front end a hinge shaft 23 revolvable in a bearing sleeve 22, on the lower end of which hinge shaft a second arm 24 is keyed and carries on its free end a driving motor 25 for the tool shaft 15. The tool shaft is thus carried by a jointed jib arm, which provides for the movements presently to be described. Current is supplied to the motor 25 by sliding contacts 26 and 27. On the bearing sleeve 19 a ratchet-wheel 28 is keyed which cooperates with two pawls 29 and 30 pivoted on the arm 21 and acting in different directions.

In the form of construction shown in Fig. 9 a spur wheel 31 is arranged on the bearing sleeve 19 instead of the ratchet-wheel with pawls, said spur wheel 31 meshing with a spur wheel 32 keyed on the hinge shaft 23. By clutch devices not shown and of known type, the spur wheel 32 can be coupled either with the hinge shaft 23 or with the bearing sleeve 22 of the same.

In the form of construction shown in Fig. 11 the driving motor 25 is mounted on the arm 21 and drives the hinge shaft 23. On the lower end of shaft 23 a sprocket wheel 33 is keyed, which drives, by means of a chain 34, a sprocket wheel 35 keyed on the tool shaft 15, thereby rotating the shaft 15.

In the form of construction shown in Figs. 12 and 13 the driving motor 25 is mounted on the bow 16 and drives the central shaft 20.

On the hinge shaft 23 a hub 36 is mounted so that it can loosely turn about this shaft and is equipped with two sprocket wheels 37, 38. The sprocket wheel 37 is driven by means of a chain 39 from a sprocket wheel 40 mounted on the central shaft 20, whereas the sprocket wheel 38 drives, by means of a chain 41, a sprocket wheel 42 keyed on the tool shaft 15, and thus drives this shaft 15 itself. Evidently, instead of the chain gears any other means for transmitting power may be employed in the last mentioned embodiments of the invention. The form of construction shown in Fig. 1 with supporting arm 17 and upright 18 may also be employed in the other embodiments of the invention.

In all forms of construction the arms 21 and 24 may be adjustable in length and adapted to be locked by any suitable known means, it being then necessary, in so far as positively cooperating driving elements are provided, to make the same exchangeable.

The operation is diagrammatically shown by Figs. 3 to 8, which especially relate to the embodiment shown in Figs. 1 and 2.

Suppose the individual parts of the jib arms to be in the position shown in Fig. 3, in which the inner arm 21 and the outer arm 24 are in alignment. If then the tool turns about the axis of its shaft 15 in the direction of the arrow, a reaction effect will be produced by the rotation of the tool in the material to be mixed. Considering the hinge 23 as a fulcrum, the unequal moments of force acting perpendicularly to the arm 24, as a result of the reaction effect, will tend to swing the arm 24 in the direction of the arrow 43; whereas at the same time an oppositely directed force acts in the direction of the arrow 44 upon the hinge shaft 23. The result is that the outer arm 24 revolves in clockwise direction about the hinge shaft 23 and the inner arm 21 swings in anti-clockwise direction about the central shaft 20. The individual parts of the jib arm accordingly assume the position indicated in Fig. 4, the force acting in the direction of the arrow 44 being decomposed into the two components 45 and 46 and only a smaller force tending to turn the inner arm 21 in anti-clockwise direction. When the elements assume the position shown in Fig. 5, the component 46 disappears completely and the inner arm part 21 comes to standstill, whereas the outer arm 24 continues its revolving movement in clockwise direction.

A component 47 occurs upon further rotation of the outer arm 24, which tends to swing the inner arm 21 in the opposite direction, i. e., in clockwise direction. However, as the locking device 28, 29, 30 only admits of a rotation in the one direction, and as this device is usually engaged, the inner arm 21 remains at standstill until the position shown in Fig. 7 has been passed and then again a component 46 occurs, as shown in Fig. 8, which tends to swing the inner arm 21 in anti-clockwise direction. Therefore, while the outer arm 24 circulates continually with the mixing tool, there always occurs an interruption of the circulation of the inner arm 21, so that this arm rotates only stepwise and, according to which one of the two pawls 29 or 30 is engaged, either in the one or the other direction. If both pawls 29 and 30 are engaged, the inner arm part 21 cannot travel in any direction and the tool merely circulates about the shaft 23. Thus it is possible to work with smaller troughs also, as indicated at 48.

Exactly the same manner of operation takes place in the form of construction shown in Fig. 11, whereas in the forms of construction shown in Figs. 9, 12 a difference can be noted in so far as the rotating movement produced by the reaction effect of the mixing tool is utilized to produce a planetary movement with the aid of spur wheels, so that in this instance the circular movement is a continuous one, always in the same direction and dependent on the revolving direction of the tool shaft 15. Also in the forms of construction shown in Figs. 9 and 12 a modification may be obtained, in that the spur wheel 32, instead of being coupled to the hinge shaft 23, is coupled with the bearing casing 22 of the same so that thereby the arm 21 remains at standstill.

Whether the drive of the tool shaft 15 takes place directly as shown in Figs. 1 and 9 or indirectly as shown in Figs. 11 and 12 does not alter the operation in the least, as in any case a reaction effect occurs by the movement of the mixing tool in the material to be mixed and has the tendency to produce a circulating movement of the tool, whereby the movements contemplated by the new arrangement automatically take place. If the arms 21 and 24 are locked in relation to one another, the whole arrangement rotates about the central shaft 20, which under certain circumstances may be desirable; likewise the complete exclusion of a rotary movement, when the arms 21, 24 are locked in relation to one another by locking the arm 21 to its bearing 19.

What I claim as my invention and desire to secure by Letters Patent of the United States is:

1. In an apparatus for treating material in the mass, a support, a jib arm attached by a vertical pivot at one end to said support, a tool mounted on the opposite end of said jib arm for rotation about a vertical axis, said jib arm being composed of two parts joined by a vertical hinge, means for rotating said tool, and ratchet means for preventing rotation of said jib arm in one direction about its pivotal connection with said support, while permitting rotation therein the reverse direction.

2. In an apparatus for treating material in the mass, a support, a jib arm attached by a vertical pivot at one end to said support, a tool mounted on the opposite end of said jib arm for rotation about a vertical axis, said jib arm being composed of two parts joined by a hinge, comprising a vertical shaft fixed to the tool-bearing part of said jib arm and a bearing for said shaft on the other part of said jib arm, means for rotating said tool, the tool-bearing part of said jib arm being adapted to rotate on said hinge in response to reaction forces generated by the rotation of said tool in the material, a stationary gear concentric with the pivotal connection of said jib arm to said support, and a gear meshing with said stationary gear fixed to said hinge shaft.

PAUL VOLLRATH.